(12) United States Patent
Le Reun et al.

(10) Patent No.: US 8,721,186 B2
(45) Date of Patent: May 13, 2014

(54) BEARING ASSEMBLY WITH A PROTECTIVE COVER FOR AN ENCODER

(75) Inventors: Patrick Le Reun, Semblancay (FR); Andrea Serafini, Pinerølo TO (IT)

(73) Assignee: Aktiebolaget SKF, Gothenburg (SE)

( * ) Notice: Subject to any disclaimer, the term of this patent is extended or adjusted under 35 U.S.C. 154(b) by 467 days.

(21) Appl. No.: 12/309,235

(22) PCT Filed: Jul. 6, 2007

(86) PCT No.: PCT/EP2007/056871
§ 371 (c)(1),
(2), (4) Date: Nov. 9, 2009

(87) PCT Pub. No.: WO2008/006777
PCT Pub. Date: Jan. 17, 2008

(65) Prior Publication Data
US 2010/0054643 A1    Mar. 4, 2010

(30) Foreign Application Priority Data
Jul. 10, 2006    (IT) .................. TO06A0501

(51) Int. Cl.
*F16C 32/00* (2006.01)
*F16C 33/76* (2006.01)

(52) U.S. Cl.
USPC .......................................... 384/448; 384/489

(58) Field of Classification Search
USPC ................. 384/448, 489, 544, 589, 476, 477
See application file for complete search history.

(56) References Cited

U.S. PATENT DOCUMENTS

| | | | | |
|---|---|---|---|---|
| 2,986,432 A * | 5/1961 | Schlauch | ....................... | 384/536 |
| 3,415,500 A * | 12/1968 | Pethis | .............. | 261/29 |
| 4,854,751 A * | 8/1989 | Grassmuck et al. | .......... | 384/537 |
| 4,988,219 A * | 1/1991 | Peilloud | ........................ | 384/448 |
| 5,375,933 A * | 12/1994 | Mizutani et al. | ............... | 384/476 |
| 5,533,815 A * | 7/1996 | Schierling et al. | ............. | 384/482 |
| 5,961,222 A * | 10/1999 | Yabe et al. | ..................... | 384/476 |
| 6,702,470 B2 * | 3/2004 | Beauprez | ...................... | 384/448 |
| 6,939,050 B2 | 9/2005 | Ohtsuki | | |
| 6,979,001 B2 * | 12/2005 | Ohtsuki et al. | ................ | 277/549 |
| 7,249,891 B2 * | 7/2007 | Aoki et al. | ..................... | 384/448 |
| 7,677,808 B2 * | 3/2010 | Shigeoka et al. | ............. | 384/544 |
| 2005/0232526 A1 * | 10/2005 | Sakamoto | ..................... | 384/544 |

FOREIGN PATENT DOCUMENTS

| | | |
|---|---|---|
| DE | 1989633 U | 7/1968 |
| DE | 102004044118 A1 | 3/2006 |
| EP | 1469239 A | 10/2004 |
| EP | 1666747 A1 * | 6/2006 |
| GB | 1205886 A | 9/1970 |

\* cited by examiner

*Primary Examiner* — Marcus Charles
*Assistant Examiner* — Adam D Rogers
(74) *Attorney, Agent, or Firm* — Bryan Peckjian; SKF USA Inc. Patent Department

(57) ABSTRACT

A radially outer stationary bearing race (11) defines, on one if its sides, an inner cylindrical surface (29) and a radial side surface (32). A radially inner bearing race (15) has an outer cylindrical surface (26) facing the inner cylindrical surface (29). A magnetic encoder (23) in form of an annular disc is fixed onto the outer cylindrical surface (26) of the inner race (15) and is protected by a cover of non-ferromagnetic material (30) mounted on the outer race (11) and abutting against the radial side surface (32). The encoder (23)extends radially from the outer cylindrical surface (26) of the inner race (15) up to near the inner cylindrical surface (29) of the outer race (11). No sealing device is mounted in the gap between the cylindrical surfaces (29) and (26).

16 Claims, 4 Drawing Sheets

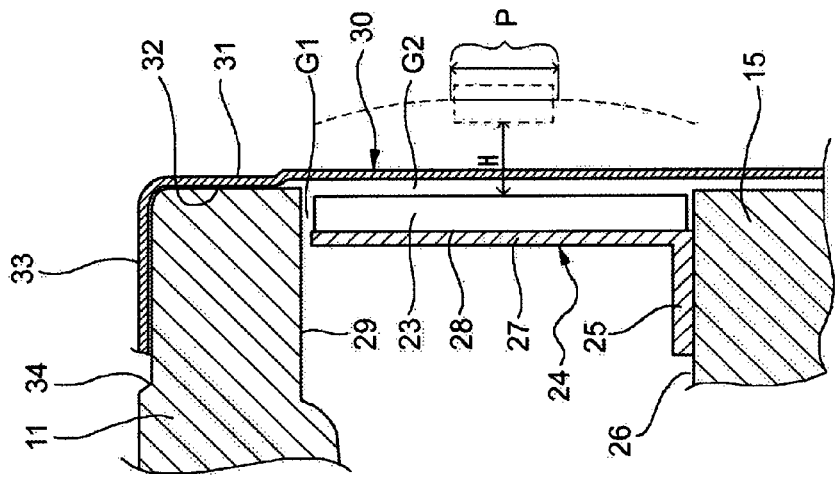
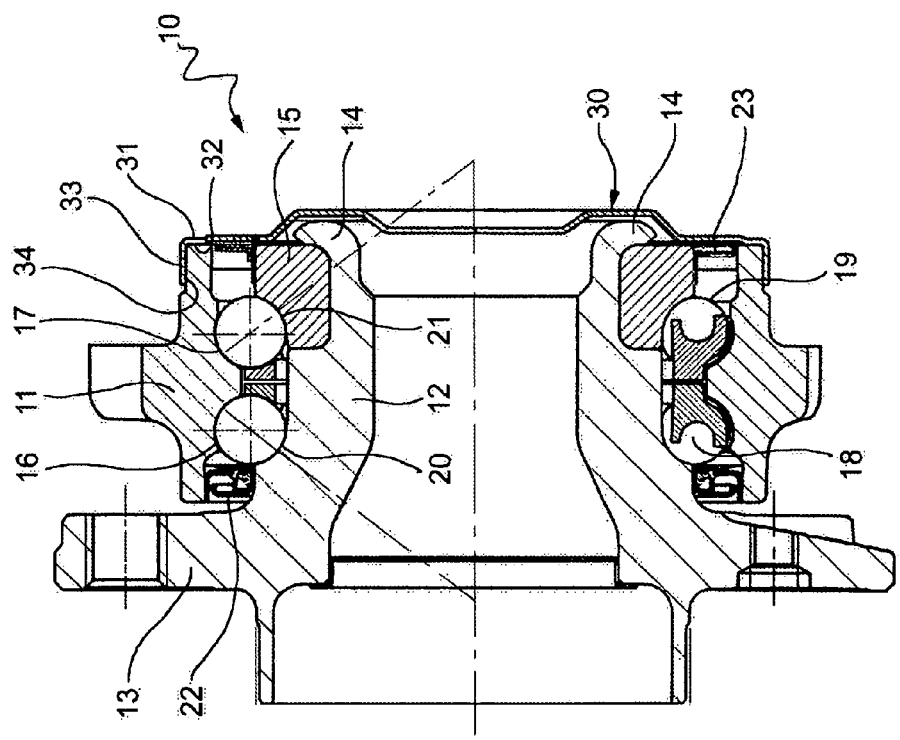

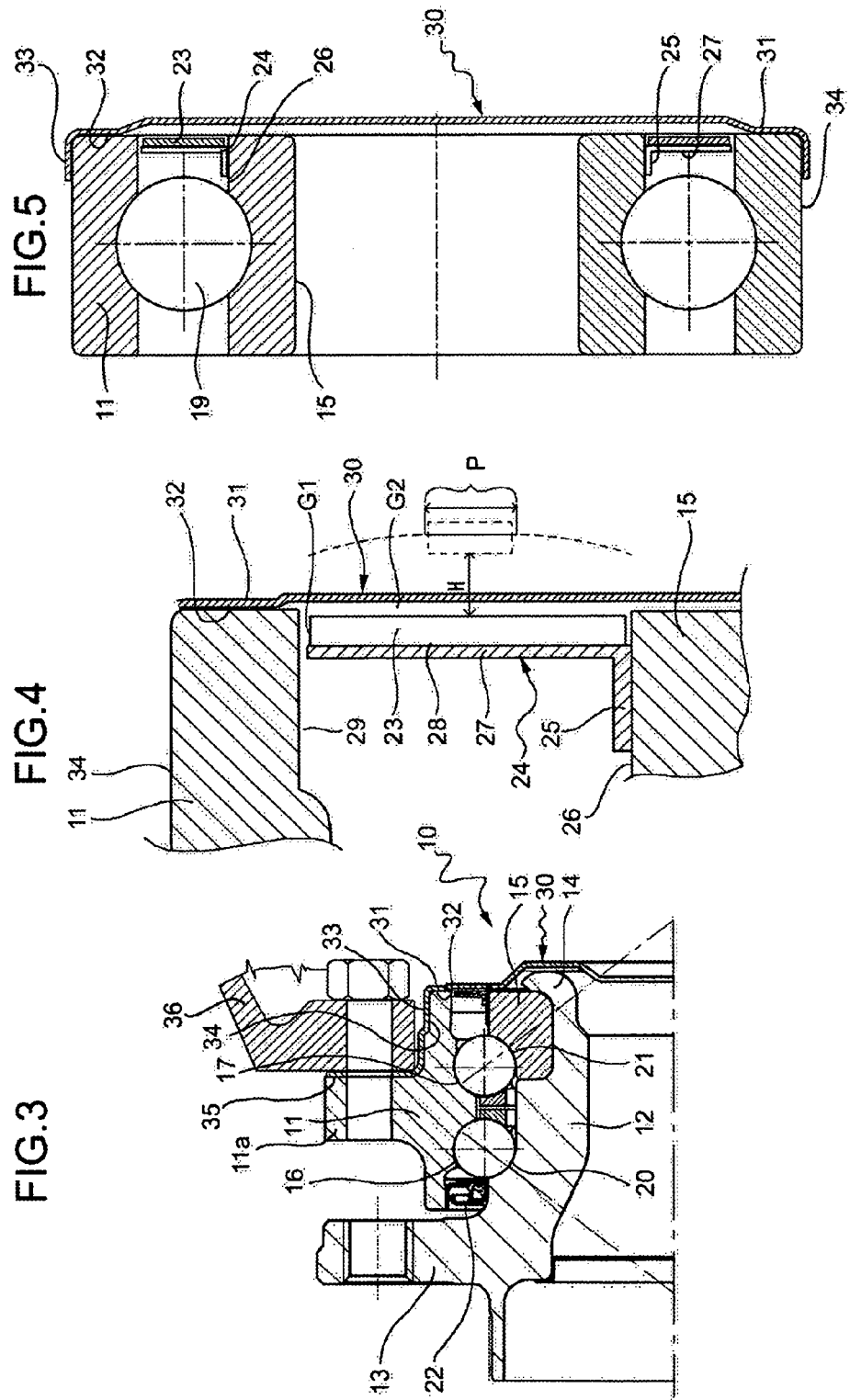

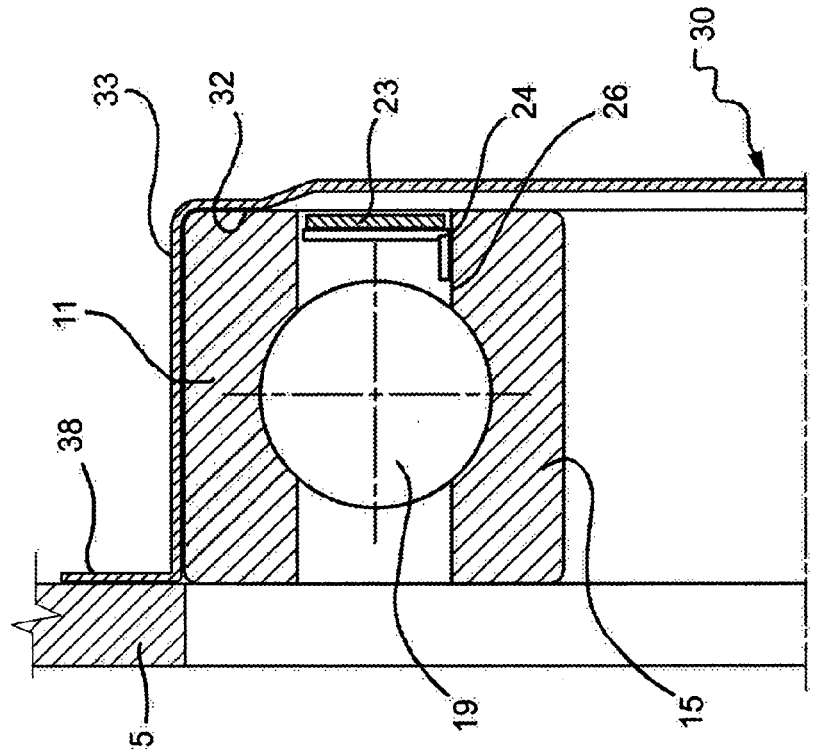
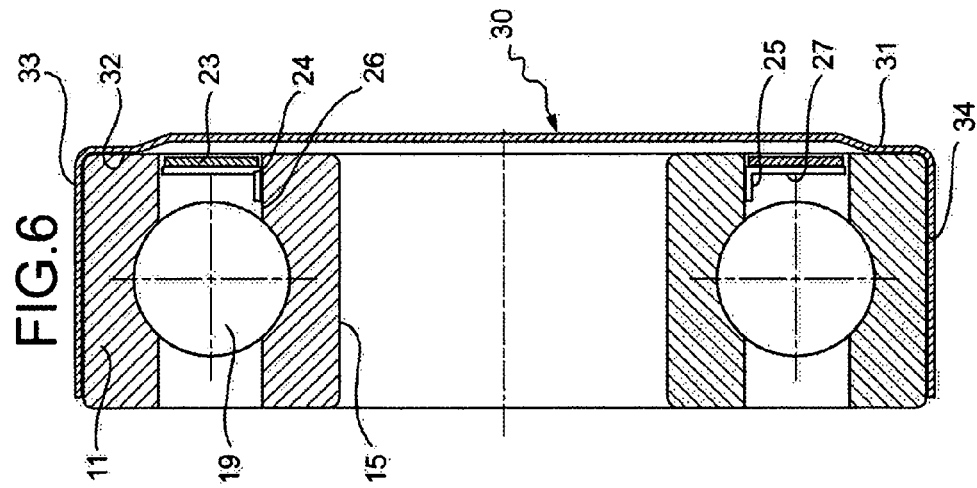

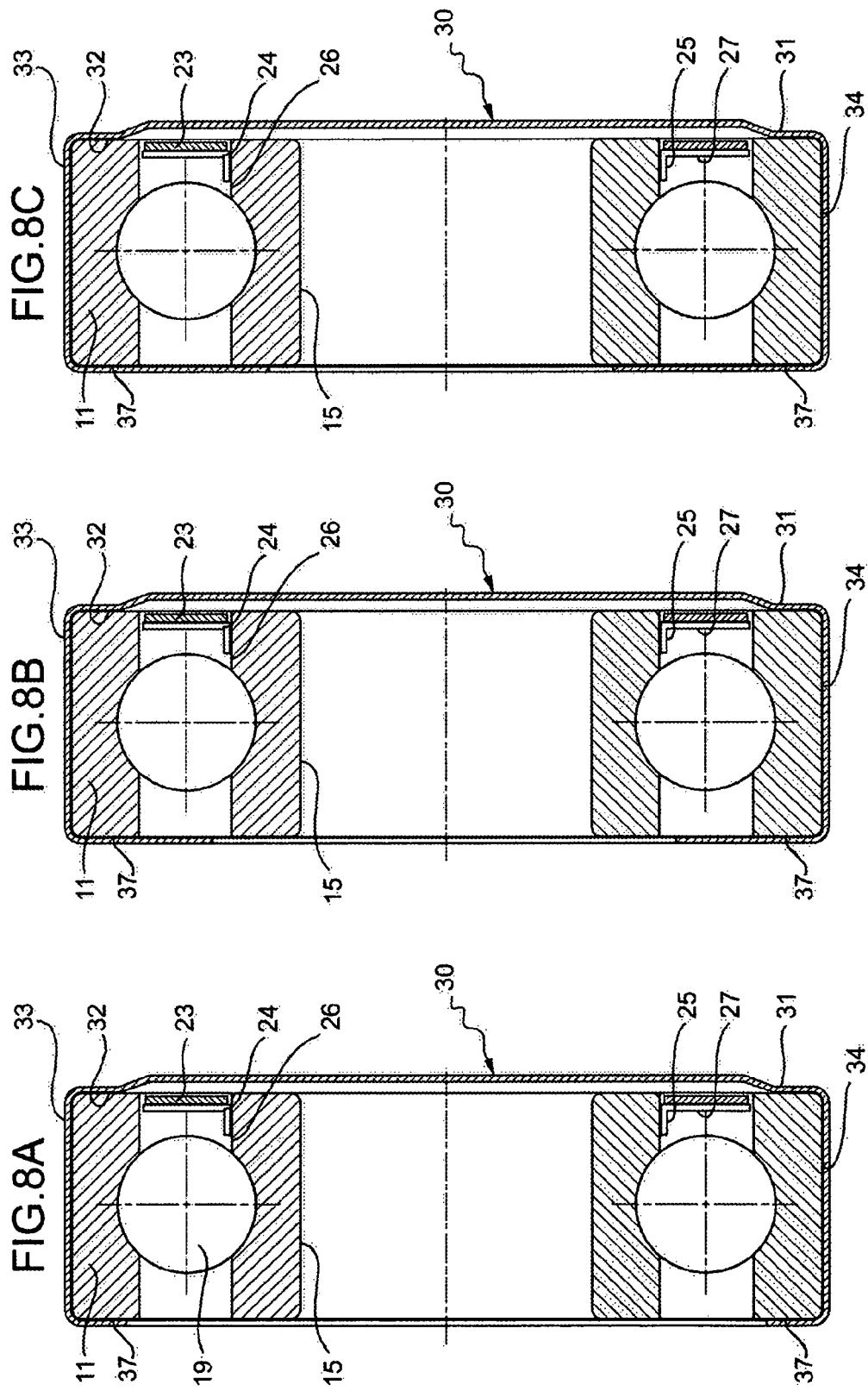

BEARING ASSEMBLY WITH A PROTECTIVE COVER FOR AN ENCODER

BACKGROUND OF THE INVENTION

The present invention relates to bearing assemblies, more particularly to a bearing assembly with a magnetic encoder.

In order to detect the relative speed of rotation between the rotating race and the stationary race of a bearing assembly, detecting devices are conventionally used comprising a magnetic encoder mounted on a rotating bearing race and a sensor that is fitted on a stationary part at a location facing the encoder at a preset distance. Electric signals generated by the sensor due to the rotation of the encoder are transmitted to a processing unit, which provides information on the rotation (rotational speed, angular position, etc.) of the rotating member. With hub-bearing units, the processing unit mounted on board of the vehicle provides information on the rotation of the wheels.

U.S. Pat. No. 6,939,050 discloses a cover of non-ferromagnetic material mounted on the outer, stationary bearing race to protect the encoder and seal the bearing from the axially inner side (or inboard side). The encoder is associated with a sealing device that limits the radial size of the encoder.

SUMMARY OF THE INVENTION

It is an object of the present invention to increase the intensity of the magnetic field generated by the encoder, so that the associated sensor will be capable of picking up magnetic pulses which are strong enough, although the cover is interposed between the encoder and the sensor. It is also desired to have more freedom in choosing the position where the sensor is to be mounted, without needing to locate it exactly in front of the middle of the radial extension of the encoder, where the magnetic field is maximum, at equal distance.

The above and other objects and advantages, that will be better understood in the following, are accomplished, in accordance with the invention, by a bearing assembly having the features defined in the appended claims.

BRIEF DESCRIPTION OF THE SEVERAL VIEWS OF THE DRAWINGS

A few preferred but not limiting embodiments of the invention will now be described, reference being made to the accompanying drawings, in which:

FIG. 1 is an axial cross sectional view of a hub-bearing assembly according to a first embodiment of the invention;

FIG. 2 is an enlarged view of a detail of FIG. 1;

FIG. 3 is an axial cross sectional view of a hub-bearing assembly according to a second embodiment of the invention;

FIG. 4 is a similar view to FIG. 2 that details a third embodiment of the invention;

FIGS. 5, 6, 7 and 8A-8C are axial cross sectional views of further embodiments of the invention.

DETAILED DESCRIPTION OF THE INVENTION

Referring initially to FIG. 1, a hub-bearing assembly is designated overall at 10 with an outer, stationary bearing race 11 fixable to the suspension standard of a motor vehicle, and a radially inner rotatable hub 12 forming a radial flange 13 to be fastened to a wheel (not shown) of a vehicle. An inner bearing race 15 is fixed on the axially inner side, or inboard side of the hub 12, by rolling an edge 14 thereof. The outer race 11 forms radially outer raceways 16, 17 for two sets of rolling bodies 18, 19, in this example balls, whereas radially inner raceways 20 and 21 are formed by the hub 11 and the inner race 15, respectively.

Whereas a conventional sealing device 22 is provided at the axially outer side (outboard side) of the assembly in order to seal the annular space between the outer race 11 and the hub 12, a device of this kind is absent on the inboard side of the assembly. On this side, located in the annular gap between the bearing races 11 and 15 is a magnetic encoder 23 in form of an annular disc fixed to a supporting ring 24 having an L-shaped cross section and mounted on the inner bearing race 15. As shown more clearly in FIG. 2, the supporting ring 24 has a cylindrical portion 25 forcefully fixed onto the outer cylindrical surface 26 of the inner race 15, and a flange 27 extending in a radially outer direction from the axially inner end of cylindrical portion 25. The annular encoder 23 is fitted on the axially inner side 28 of the flange 27, and extends radially up to near the inner cylindrical surface 29 of the outer race 11. The radial gap G1 between the inner surface 29 of the outer race and the outer peripheral edge of the encoder may be kept as narrow as about 0.2 mm, so as to avoid any contact between the rotating encoder 23 and the non-rotating outer race 11, also in case the encoder is mounted with some defect and/or under the action of high external loads, particularly lateral loads which tend to deflect the bearing in an axial plane.

A protective cover 30 made of non-ferromagnetic material (for example aluminium, copper, or the like) is applied on the inboard side of the hub-bearing assembly to protect the encoder and seal the bearing, leaving a minimum axial gap G2 between the cover 30 and the axially inner side of the encoder.

The cover 30 has a radial peripheral portion 31 axially abutting against the side surface 32 of the outer race 11 facing the inboard side and, in the preferred embodiment shown in the drawings, an axial cylindrical edge 33 that is forcedly fitted on the outer cylindrical surface 34 of the bearing outer race.

Owing to the above described arrangement, in accordance with the invention the radial size of the encoder is increased, thereby exploiting practically all the space between the bearing races 11 and 15. As a result, a more intense magnetic field is generated. This allows also the designer to have more freedom in positioning the sensor (not shown), which will not necessarily have to be facing the encoder exactly at half its radial extension, where the magnetic field is at its maximum intensity, at equal distance from the encoder. Owing to the invention, the sensor may instead be located also at radially outer or inner positions, as indicated at P in FIG. 2, according to requirements and available space. In this way, even though the sensor may not be positioned exactly in front of the mid portion of the encoder, it will nevertheless be able to pick up a magnetic signal being intense enough to generate an electric signal clearly indicating rotation parameters of the hub.

With the hub-bearing units of the general design discussed herein, the side surface 32 is conventionally machined with high accuracy since it serves as a reference surface for fitting the encoder in the hub-bearing unit and, as said above, for determining the correct axial position of the cover 30. In this way an accurately sized minimum axial gap G2 is achieved, allowing to reduce the overall distance between the encoder and the sensor (not shown). Since a sealing device has no longer to be fitted in the inner cylindrical surface 29 of the outer race, machining of this surface can be dispensed with, which is advantageous since it eliminates a conventionally required step. Moreover, in the hub-bearing assembly according to the invention, with respect to the prior art there is also eliminated the sealing device arranged on the inboard side of the assembly. This reduces rolling friction of the assembly and cuts down manufacturing and assembling costs of a sealing device. Finally, the axial dimension of the outer 11 and inner 15 bearing races on the inboard side may be reduced, since it is not necessary to accommodate a sealing device, but only the encoder 23, which takes up a rather limited axial space. This helps to make the assembly lighter and axially compact. As an alternative, at equal axial bulk, the two sets of rolling bodies may be further spaced apart, thereby gaining a greater rigidity of the assembly as a whole concerning bending in an axial plane. This prevents any contact between the peripheral edge of the encoder and the inner cylindrical surface 29 of the outer race.

In the embodiment shown in FIG. 3, the cover 30 forms a radially outer extension or flange 35 interposed between the bearing outer race 11 and the suspension standard 36. The flange 35, by covering the inboard side of the outer race flange 11a, serves to prevent the suspension from contacting the bearing, and therefore avoid electrolytic corrosion at the interface between two bodies made of different metals, which would otherwise render the bearing unit difficult to remove from the suspension.

It is to be understood that invention is not limited to the embodiments described and illustrated herein, which are to be considered as examples of the assembly; rather, the invention can undergo modifications concerning shape and arrangement of parts, constructional and functional details, as will be apparent to those skilled in the art. As an example, the protective cover may not have the peripheral edge 33, as shown in the embodiment of FIG. 4. Here, the cover 30 is fitted directly on the side surface 32 of the outer race 11 for instance by brazing or soldering or welding or glueing, without requiring any machining of the outer cylindrical surface 34 of the outer bearing race in order to fit the cover to the bearing, and therefore without forming the step visible in FIG. 2.

Further, the invention is applicable also to bearing assemblies different from the kinds illustrated in FIGS. 1 and 3. For example, as shown in the embodiment of FIG. 5, the invention may be applied to bearing assemblies for virtually any rotating member for which a rotation feedback is needed (e.g. angular position, rotational speed, etc.). FIG. 5 shows a cover 30 fitted to a bearing unit having a single set of rolling bodies, in this example a deep groove ball bearing unit. In the variant embodiment of FIG. 6, the peripheral edge 33 extends forming a skirt over the outer cylindrical surface 34 to be interposed between the bearing outer race 11 and the bearing housing (not shown). In the example of FIG. 7, the skirt 33 is prolonged on the side of the bearing opposite the side with the encoder, and forms a radially outer flange 38 that provides a means for mounting the bearing unit to a support 5 such as a wall, or a housing to which the cover is to be secured in any known manner. As an alternative or in addition to any of the above cited means of fastening the cover to the side of the bearing where the encoder is fitted, the cover can also be fastened to the bearing on the opposite side. In the embodiments of FIGS. 8A, 8B and 8C, the cover 30 is fastened to the bearing by means of radially inwardly projecting portions 37, for example in the form of circumferentially adjacent tabs that extend from the skirt 33 and are bent against or towards the side of the bearing opposite to the side where the encoder is fitted. The radial extent of the tabs 37 provides different degrees of sealing action on that side of the bearing.

The invention claimed is:
1. A bearing assembly comprising:
   a radially outer stationary bearing race defining a first side surface thereof, an inner cylindrical surface and an outer cylindrical surface;
   a radially inner bearing race having an outer cylindrical surface facing the inner cylindrical surface of the radially outer stationary bearing race and defining a gap therebetween;
   a magnetic encoder including an annular disc fixed onto the outer cylindrical surface of the radially inner bearing race, the annular disc being located in the gap and having a radial thickness greater than an axial thickness and a radially extending face facing out of the gap; and
   a protective cover of non-ferromagnetic material mounted on the radially outer stationary bearing race and abutting against the first side surface, configured to protect the magnetic encoder and to close the gap and presenting a radial peripheral portion abutting against the first side surface extending to an axial cylindrical edge abutting the outer cylindrical surface and further extending to a radially inwardly projecting portion extending inwardly to cover a side of the radially outer stationary bearing race being opposite from the first side surface of the radially outer stationary bearing race and further abutting the radially inner bearing race wherein the magnetic encoder extends radially substantially from the outer cylindrical surface of the radially inner bearing race to proximal the inner cylindrical surface of the radially outer stationary bearing race.

2. The bearing assembly according to claim 1, wherein the magnetic encoder extends to about 0.2 mm from the inner cylindrical surface of the radially outer stationary bearing race.

3. The bearing assembly according to claim 1, wherein the protective cover has the radial peripheral portion fixed by at least one of brazing, soldering, welding, and adhering to the first side surface of the radially outer stationary bearing race.

4. The bearing assembly according to claim 1, wherein the magnetic encoder includes a supporting ring securing the annular disc to the outer cylindrical surface of the radially inner bearing race and wherein the supporting ring is located entirely in the gap.

5. The bearing assembly according to claim 4, wherein the annular disc is located entirely in the gap.

6. The bearing assembly according to claim 1, wherein the annular disc substantially fills an axial end segment of the gap.

7. A bearing assembly comprising:
   a radially outer stationary bearing race having an inner cylindrical surface and an outer cylindrical surface and a first side surface between the inner cylindrical surface and the outer cylindrical surface, the first side surface lying in a plane;
   a radially inner bearing race having an outer cylindrical surface facing the inner cylindrical surface of the radially outer stationary bearing race and spaced from the inner cylindrical surface of the radially outer stationary bearing race by a gap;
   a magnetic encoder including an annular disc fixed to the outer cylindrical surface of the radially inner bearing race and located in the gap on a first side of the plane;
   a protective cover of non-ferromagnetic material mounted on the first side surface of the radially outer stationary bearing race, the protective cover including an axially inner side wall having a first portion in contact with the first side surface at the plane and a second portion, radially inward of the first portion, axially offset from the plane on a second side of the plane opposite the first side of the plane and spaced from the plane by a space, the second portion of the axially inner side wall extending radially across the gap and facing the annular disc, wherein a width of the space and a thickness of the protective cover are selected such that the magnetic encoder is readable by a sensor through the protective cover.

8. The bearing assembly according to claim 7, wherein the second portion of the axially inner side wall extends over a portion of the first side surface, across the gap, and over the radially outer cylindrical surface of the radially inner bearing race.

9. The bearing assembly according to claim 7, wherein the annular disc has a radial thickness greater than an axial thickness and substantially fills an axial end segment of the gap.

10. The bearing assembly according to claim 9, wherein the magnetic encoder is located entirely on the first side of the plane.

11. The bearing assembly according to claim 7, wherein the magnetic encoder is located entirely on the first side of the plane.

12. The bearing assembly according to claim 7, wherein the radially inner bearing race includes an axially outer side lying in the plane.

13. The bearing assembly according to claim 7, wherein the width of the space is less than a thickness of the protective cover.

14. The bearing assembly according to claim 7, wherein the second portion overlies a portion of the first side surface.

15. The bearing assembly according to claim 7, wherein no sensor is present in any region between any portion of the protective cover and the magnetic encoder.

16. The bearing assembly according to claim 7, wherein the second portion of the axially inner side wall includes a first part facing the first side surface, a second part facing the magnetic encoder in the gap and a third part facing an axially outer side of the radially inner bearing race and wherein the annular disc has a radial thickness greater than an axial thickness and wherein a radially extending face of the annular disc faces the second part of the protective cover axially inner side wall and wherein the annular disc substantially fills an axial end segment of the gap.

* * * * *